(12) United States Patent
Eusterbarkey et al.

(10) Patent No.: US 10,947,958 B2
(45) Date of Patent: Mar. 16, 2021

(54) WIND TURBINE HAVING DRIVE TRAIN

(71) Applicant: Senvion GmbH, Hamburg (DE)

(72) Inventors: Carsten Eusterbarkey, Simonsberg (DE); Alf Trede, Immenstedt (DE)

(73) Assignee: Senvion GmbH, Hamburg (DE)

( * ) Notice: Subject to any disclaimer, the term of this patent is extended or adjusted under 35 U.S.C. 154(b) by 91 days.

(21) Appl. No.: 16/227,244

(22) Filed: Dec. 20, 2018

(65) Prior Publication Data

US 2019/0186467 A1   Jun. 20, 2019

(30) Foreign Application Priority Data

Dec. 20, 2017 (DE) .................. 10 2017 011 804
Jun. 15, 2018 (DE) .................. 10 2018 004 763

(51) Int. Cl.
*F16H 57/08* (2006.01)
*F16H 57/021* (2012.01)
(Continued)

(52) U.S. Cl.
CPC ........... *F03D 15/00* (2016.05); *F03D 7/0204* (2013.01); *F03D 80/70* (2016.05); *F16C 19/36* (2013.01);
(Continued)

(58) Field of Classification Search
CPC .. F16H 57/02–039; F16H 1/28; F16H 57/082; F16H 2057/02078; F03D 15/00; F03D 80/70; F03D 7/0204; F16C 19/36; F16C 17/00; F16C 19/385; F16C 19/546; F16C 2360/31; F05B 2240/50
See application file for complete search history.

(56) References Cited

U.S. PATENT DOCUMENTS

2011/0033299 A1\* 2/2011 Leimann ................. F03D 15/00
                                                          416/170 R
2011/0210490 A1\* 9/2011 Mitsch ...................... F16F 1/41
                                                            267/141
(Continued)

FOREIGN PATENT DOCUMENTS

DE      102006027543         12/2007
DE      102007009575 b4 *    1/2018  ............. F03D 80/00
EP        3232055 A1 *      10/2017  ............ F16C 35/042

OTHER PUBLICATIONS

English Translation of DE102006027543.

*Primary Examiner* — Ernesto A Suarez
*Assistant Examiner* — Lillian T Nguyen
(74) *Attorney, Agent, or Firm* — Alix, Yale & Ristas, LLP

(57) ABSTRACT

A wind turbine has a drive train that comprises a rotor shaft and a planetary gear train having a first gear stage, the rotor shaft being connected to the planet carrier of the first gear stage in a fixed and backlash-free manner. The rotor shaft is supported, on the side that faces away from the first gear stage, by a toroidal roller bearing, on a first carrying structure. The planet carrier that is connected to the rotor shaft in a fixed and backlash-free manner is supported by a moment bearing, as a fixed bearing. The outer ring of the moment bearing is connected to a housing. The combination of the outer ring of the moment bearing and the housing is connected to a second carrying structure via at least three elastic suspension elements arranged in an annular manner around the rotor axis.

20 Claims, 3 Drawing Sheets

(51) Int. Cl.
*F03D 15/00* (2016.01)
*F03D 80/70* (2016.01)
*F16H 1/28* (2006.01)
*F16C 19/36* (2006.01)
*F03D 7/02* (2006.01)
*F16H 57/02* (2012.01)
*F16C 17/00* (2006.01)
*F16C 19/38* (2006.01)
*F16C 19/54* (2006.01)

(52) U.S. Cl.
CPC ............. *F16H 1/28* (2013.01); *F16H 57/021* (2013.01); *F16H 57/082* (2013.01); *F05B 2240/50* (2013.01); *F05B 2260/40311* (2013.01); *F05B 2260/902* (2013.01); *F16C 17/00* (2013.01); *F16C 19/385* (2013.01); *F16C 19/546* (2013.01); *F16C 2360/31* (2013.01); *F16H 2057/02078* (2013.01)

(56) References Cited

U.S. PATENT DOCUMENTS

| | | | |
|---|---|---|---|
| 2013/0088016 A1* | 4/2013 | Dinter | F03D 80/70 290/55 |
| 2013/0170989 A1* | 7/2013 | Trede | F03D 7/0204 416/9 |
| 2015/0308414 A1* | 10/2015 | Roer | F03D 80/82 416/1 |
| 2017/0159643 A1* | 6/2017 | Kim | F03D 7/0204 |
| 2018/0372071 A1* | 12/2018 | Muller | F03D 7/047 |
| 2019/0024776 A1* | 1/2019 | Wilson | F03D 1/06 |
| 2019/0301436 A1* | 10/2019 | Trede | F03D 13/20 |

* cited by examiner

WIND TURBINE HAVING DRIVE TRAIN

BACKGROUND

The invention relates to a wind turbine having a drive train that comprises a rotor shaft and a planetary gear train.

In the case of known wind turbines, a rotor, which is rotatable about a substantially horizontal axis, can be put into rotation by the wind. The rotor in this case is fixedly connected to a rotor shaft and, via a gearbox, to a generator for converting the rotational energy of the rotor into electrical energy.

For the purpose of supporting the rotor it is known to support the drive train of the wind turbine by means of a so-called three-point bearing arrangement. The rotor shaft in this case is supported by a front bearing arranged close to the region of connection to the rotor, and in the rear region is linked to the gearbox, which, at two lateral gearbox supports, is fastened to the mainframe of the wind turbine. In the case of such a three-point bearing arrangement, the rotor shaft is supported, in particular in respect of flexural loads, via the bearings of the gearbox.

Different variants of the three-point bearing arrangement of the rotor of a wind turbine are described in the document DE102006027543A1. It is common to these variants that the front bearing for the rotor shaft is designed as a fixed bearing, which can also absorb axial forces, and that couplings are provided between the rotor shaft and the first gear stage, in order to keep deformations of the rotor shaft that are caused, for example, by wind forces acting upon the rotor, away from the gearbox, so that the latter is not damaged. For this purpose, according to DE102006027543A1, a torsion disk may be provided, which acts in combination with the first gear stage, via a toothed coupling, in order to compensate axial forces or flexural deformations. Alternatively, at least the transmission of axial forces to the gearbox is avoided by means of a separable shaft-hub connection. Corresponding connections are disadvantageous, however, since their production is normally complicated because of the torques to be transmitted.

A wind turbine is disclosed in which disadvantages known from the prior art no longer occur, or occur only to a reduced extent.

DEFINITIONS

First, some terms used in connection with the invention are explained.

A "planetary gear train" is an epicyclic gear train that, in each gear stage, comprises, as gear train components, an internally toothed ring gear, an externally toothed central gear, and a planet carrier having, arranged thereon, at least one planet gear, which engages both in the toothing of the ring gear and in the toothing of the sun gear. Normally, one of the gear train components of a gear stage of a planetary gear train—frequently the ring gear—is held fixed, while the two other gear train components are rotatable about a common axis, with a gear ratio that is predefined by the dimensioning of the individual gear wheels of the gear train. A planetary gear train may have a plurality of gear stages. It is also possible, however, for a planetary gear train to comprise only one gear stage, in which case the first gear stage is then simultaneously the sole gear stage.

A "toroidal roller bearing"—also called a "CARB bearing" or "CARB toroidal roller bearing"—is a single-row rolling bearing having symmetrical, relatively long, slightly convex rollers and torus-shaped, profiled raceways. Corresponding bearings can absorb exclusively radial loads, for which reason in principle they can be used only as floating bearings.

The term "moment bearing" denotes a rotary bearing that enables axial and radial forces to be transmitted, and enables the absorption of moments that do not act about the rotation axis. In particular, a moment bearing can absorb flexural moments acting upon a shaft supported therein.

A connection is considered to be "fixed and backlash-free" if, in the case of normally expected loads on the connection, practically no relative movement occurs between the thus connected components.

"Hole pattern" is the arrangement of the drilled holes for a screwed connection between two components, wherein only those drilled holes through which screws are also actually passed in the assembled state belong to the hole pattern. In connection with the invention, drilled holes that are not used for the screwed connection do not belong to the hole pattern. If the drilled holes of a hole pattern are arranged on a circle, the hole pattern can by the specification of the diameter of the individual drilled holes, the diameter of the hole circle of the drilled holes, the number of drilled holes on the hole circle, and the position of the drilled holes on the hole circle.

Elements—such as, for example, drilled holes on a hole circle, or suspension elements around the rotor axis—are considered to be "evenly distributed over the circumference" if the angular spacing between respectively adjacent elements is of the same magnitude in each case.

SUMMARY

Accordingly, a wind turbine has a drive train that comprises a rotor shaft and a planetary gear train having a first gear stage, the rotor shaft being connected to the planet carrier of the first gear stage in a fixed and backlash-free manner, the rotor shaft being supported, on the side that faces away from the first gear stage, by means of a toroidal roller bearing, on a first carrying structure, the planet carrier that is connected to the rotor shaft in a fixed and backlash-free manner being supported by means of a moment bearing, as a fixed bearing, the outer ring of the moment bearing being connected to a housing, and the combination of the outer ring of the moment bearing and the housing being connected to a second carrying structure via at least three elastic suspension elements arranged in an annular manner around the rotor axis.

In the case of the disclosed wind turbine, all rotor thrust exerted upon the drive train by the wind, and any bending moments, are introduced, via the fixed bearing arranged on the planet carrier connected in a fixed and backlash-free manner to the rotor shaft, via the elastic suspension elements, into the second carrying structure. The toroidal roller bearing is a floating bearing that, besides weight forces, substantially also serves to absorb pitching and yawing movements acting upon the drive train. Owing to its specific design, the toroidal roller bearing is very robust in the case of angular errors and axial backlash, for which reason highly precise alignment of the floating bearing relative to the fixed bearing—as known in the case of bearing concepts from the prior art—is not required for the bearing arrangement. Possible deviations from a theoretically ideal alignment are normally easily compensated by the toroidal roller bearing. The same applies for any positional change due to possible deformation of the elastic suspension elements during the operation of the wind turbine. Owing to its compact structural design and robustness, the toroidal roller bearing in this case is also very suitable for use in wind turbines having shaft diameters of more than 2.5 m.

The housing is preferably the gearbox housing, to which the further components of the first gear stage, and possibly further gear stages, of the planetary gear train are connected in a fixed or rotatable manner. In this case, owing to the connection of the outer ring of the moment bearing and the housing, which—also in the case of other embodiments—is preferably fixed and backlash-free, such a bearing arrangement of the planet carrier of the first gear stage relative to the gearbox housing ensures that, even under load, there is practically no change in the position of the rotation axis of the planetary axis relative to the gearbox housing, and thus also of the other components of the planetary gear train. This also applies, in particular, to the internally toothed ring gear and to the externally toothed sun gear of the first gear stage. The ring gear in this case may be, for example, fixedly connected to the housing, while the externally toothed sun gear is supported, by appropriate bearings, so as to be rotatable relative to the gearbox housing.

Since the fixed bearing is realized as a moment bearing, a precise axial guidance can accordingly be achieved between the gearbox housing and the planet carrier, i.e. with an appropriately designed bearing, they can practically no longer move relative to each other in the axial direction. Pitching moments can also be absorbed by the bearing. As a consequence, a harmful change of position of the individual components of the first gear stage in relation to each other can be avoided, even if the drive train is subjected to high load. A coupling, such as that frequently required in the prior art to keep deformations of the rotor shaft away from the gear train, can be omitted.

It is preferred if six or more, further preferably sixteen or more, elastic suspension elements are provided, the suspension elements are preferably evenly distributed over the circumference. A corresponding number and arrangement of elastic suspension elements enables the force flow through the housing to be well distributed, and enables particularly high force peaks in the housing to be avoided.

It is preferred if the elastic suspension elements are cylindrical, such a structural form renders possible simple and inexpensive production with, at the same time, a high load-bearing capacity, in particular in the radial direction of the cylinder. The structural form in question is also known by the designation ultra bushing.

It is further preferred that the elastic suspension elements are arranged with their cylinder axis parallel to the rotor axis. This arrangement renders possible good absorption of pitching, yawing and rotational moments, the rotor thrust being absorbed in the axial direction of the elastic suspension elements. Moreover, the said arrangement can normally also provide for ease of replacement, including of individual suspension elements.

It is preferred that the elasticity of the elastic suspension elements is designed so as to be direction-dependent, in such a manner that there is a sufficient stiffness present in the circumferential direction to direct the gear torque completely into the second carrying structure solely via the suspension elements. A corresponding design of the suspension elements makes it possible to dispense with a separate torque support for the gearbox. Owing to the absence of the lateral torque supports, the drive train can be made significantly slimmer, as a result of which the transport width is reduced and transport of the drive train is simplified.

The suspension elements may be, for example, of rubber. The second carrying structure may extend in the form of a ring around the rotor shaft.

The moment bearing may be a sliding bearing or a rolling bearing. If a rolling bearing is provided, it is preferred that it is a two-row tapered-roller bearing slanted in an X or O arrangement. Corresponding moment bearings provide a backlash-free bearing arrangement with a high load capacity, in which the necessary tensioning of the individual bearing components is substantially insensitive to temperature effects, owing to the short tensioning length. In comparison with a comparable bearing with an X arrangement, the O arrangement is distinguished by an even greater moment absorption capacity.

It is preferred if the tapered-roller bearing has a, preferably inductively hardened, divided outer or inner ring, the parts of the divided ring preferably have drilled holes for a screwed connection. A drilled hole can facilitate the mounting, tensioning and/or axial fixing of the moment bearing. The moment bearing in this case may be connected, via the housing, to the elastic suspension elements. In this case, the moment bearing may be mounted, for example in a known manner, in the housing and connected to the latter. Since, in the case of this combination, the elastic suspension elements act on the housing, the flow of force is affected from the moment bearing, via the housing and the suspension element, into the second carrying structure.

It is also possible, however, for the outer ring of the moment bearing to be directly connected to the elastic suspension elements, to enable the forces resulting from the bearing arrangement to be transmitted directly into the carrying structure. However, since in this case the housing is still connected to the outer ring of the bearing, owing to the weight of the planetary gear train and possibly of further components connected thereto, they are also introduced into the second carrying structure via the outer ring of the bearing and the suspension elements.

Further, a preferred embodiment provides that a part of the divided ring has thread-free drilled through-holes, and the other part, preferably the part of the divided ring at a greater distance from the toroidal roller bearing, has drilled holes having an internal thread. In this case the ring in question thus consists of two rings, which, arranged concentrically, form the inner or outer ring. The parting joint between the two rings in this case is preferably designed in such a manner that, by reduction of the joint width, preferably to zero, or by a corresponding tensioning of the two parts, a bearing preload can be achieved by which, inter alia, a relative axial movement of the inner and outer ring can then be prevented. For this purpose, in the case of an X arrangement at least the outer ring must be provided as a divided ring, and in the case of an O arrangement the inner ring. A corresponding design enables simple mounting and tensioning of the tapered-roller bearing to be achieved.

In this case the outer ring thus consists of two rings, which, arranged concentrically, form the outer ring. The parting joint between the two rings in this case is preferably designed in such a manner that, by reduction of the joint width, preferably to zero, or by a corresponding tensioning of the two parts, a bearing preload can be achieved by which, inter alia, a relative axial movement of the inner and outer ring can then be prevented.

It may also be provided that the planet carrier of the first gear stage, on the side of the two-row rolling bearing that faces away from the rotor shaft, is supported in the gearbox housing by means of a support bearing designed as a floating bearing. A fixed-floating support of the planet carrier in the gearbox housing is achieved by such an additional bearing arrangement. The certainty that the position of the rotation axis of the planet carrier will not change relative to the gearbox housing, even under load, is thereby further increased. The support bearing may be a rolling bearing, preferably a cylindrical roller bearing. The support bearing serves primarily to take up the gearbox's own weight. This is advantageous, in particular, if an additional spur gear stage or a generator is directly flange-mounted onto the planetary gear train. Since the center of gravity of the gearbox in this case is displaced further backward, i.e. away from the rotor shaft, without the additional support bearing the complete gearbox weight would have to be taken up by the moment bearing. On the other hand, the support bearing may be omitted in the case of embodiments in which the gearbox is of a very compact design, since both the gearbox weight and the resultant, and comparatively small, gearbox weight moment can be absorbed completely by the moment bearing.

The first and/or the second carrying structure may be fastened to a mainframe or realized as a single piece with the latter. The mainframe absorbs all forces acting upon the components fastened thereto, and ultimately directs them into the tower of the wind turbine. The mainframe in this case may be connected to a yaw bearing arranged on the tower, in order to achieve a rotation of the mainframe, and of the rotor axis normally arranged fixedly in relation thereto, in the azimuth direction. Yaw drives are provided for ultimate rotation, and yaw brakes, usually in form of yaw brake calipers, are provided to secure the mainframe in a particular azimuthal position.

In the case of a disclosed wind turbine, but possibly also in the case of any other wind turbine, having a mainframe for accommodating component parts for supporting the rotor of the wind turbine, it is preferred that the mainframe has a flange having a hole pattern identical to the hole pattern of the yaw bearing of the wind turbine, and a carrier plate is provided for accommodating at least six yaw drives, the carrier plate having a hole pattern identical to the hole pattern of the yaw bearing and being arranged between the mainframe and the yaw bearing in such a manner that the screwed connection of the mainframe to the yaw bearing is routed through the hole pattern of the carrier plate.

Thus, the fastening of the yaw drives is no longer effected directly to the mainframe, which is usually a cast part that, possibly in an elaborate and cost-intensive manner, has to be provided with suitable, specially designed mounts for the yaw drives, but instead via the carrier plate provided herein, which, or the arrangement of which between the mainframe and the yaw bearing, possibly provides separate protection.

The carrier plate is distinguished by a hole pattern that corresponds to the hole patterns on the flange of the mainframe and of the yaw bearing, such that the carrier plate can be easily clamped-in by the screwed connection provided for fastening the mainframe to the yaw bearing, such that a separate fastening is not required.

Furthermore, the carrier plate also has a number of receivers, beyond the usual number of yaw drives, which preferably are all also provided with a yaw drive. Owing to the additional yaw drives, the reaction forces introduced into the carrier plate at the individual drives, and junk moments resulting therefrom, can be reduced, such that the carrier plate can have a lesser thickness, compared with a plate having only four yaw drives.

It is preferred that the carrier plate is designed to accommodate eight or more yaw drives. Here also it is the case that preferably respectively one yaw drive is provided in each receiver of the carrier plate provided for this purpose.

On the side that faces away from the receiver of the yaw drives, the carrier plate may have at least five, preferably at least eight, receivers for yaw brakes, preferably respectively one yaw brake being provided in each receiver provided for this purpose.

BRIEF DESCRIPTION OF THE DRAWINGS

The invention is now explained exemplarily on the basis of an advantageous embodiment, with reference to the appended drawings. There are shown.

DETAILED DESCRIPTION

Figure 1:
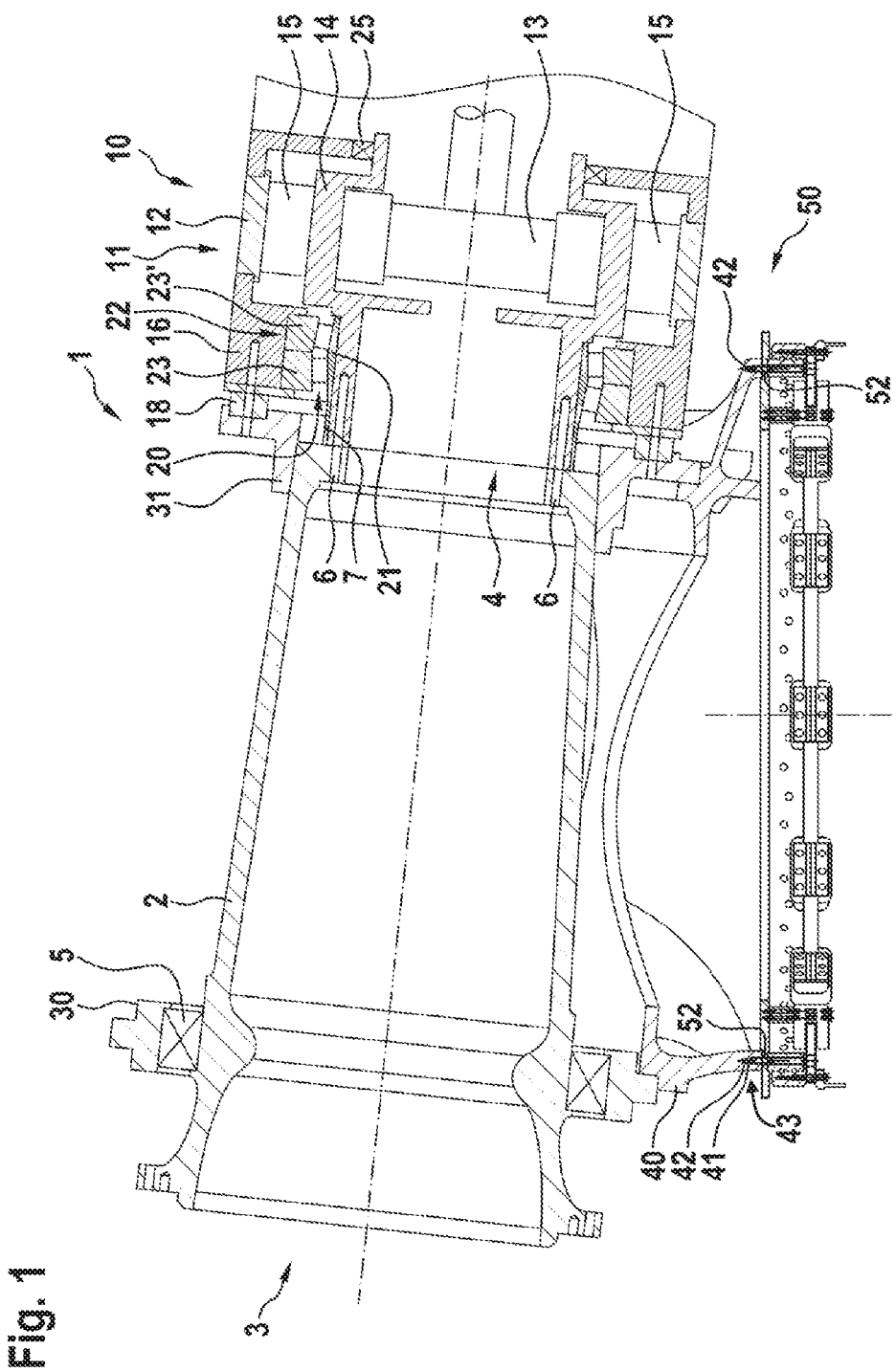
FIG. 1 is a schematic partial representation of the drive train of a first exemplary embodiment of a wind turbine, in a sectional view.

Represented schematically in FIG. 1, with the relevant parts, is the drive train 1 of a wind turbine.

The drive train 1 comprises a rotor shaft, fastened to one end 3 of which is the rotor of the wind turbine (not represented). Arranged at the other end 4 of the rotor shaft 2 is a planetary gear train 10, of which only the first gear stage 11 is represented.

The first gear stage 11 comprises an internally toothed ring gear 12, an externally toothed sun gear 13, and a planet carrier 14 having, arranged thereon, planetary gears 15 which engage both in the toothing of the ring gear 12 and in the toothing of the sun gear 13, as gear set components. The ring gear 12 is fixedly connected to the gearbox housing 16, while the sun gear 13 is supported, so as to be rotatable relative to the gearbox housing 16, by rolling bearings, which are not represented for reasons of clarity. The support of the planet carrier 14 in the gearbox housing 16 by the two-row rolling bearing 20 and the (optional) support bearing 25 is discussed in greater detail in the following.

In the region of the end 3 provided for connection to the rotor, the rotor shaft 2 is supported, by a toroidal roller bearing 5, on the first annular carrying structure 30, which completely surrounds the rotor shaft 2. At its other end 4, the rotor shaft 2 is connected in a fixed and backlash-free manner, by a screwed connection 6, which is merely indicated, to the planet carrier 14 of the first gear stage 11.

In addition, by means of the screwed connection 6 and the spacing sleeve 7, the inner ring 21 of the rolling bearing 20 is fixedly secured by clamping-in on the planet carrier 14 of the first gear stage 11. The rolling bearing 20 is designed as a two-row tapered-roller bearing slanted in an X arrangement. The outer ring 22 of the two-row rolling bearing 20 is divided into two rings 23, 23'. Owing to the clamping-in of the outer ring 22, represented in FIG. 1, the two rings 23, 23' are tensioned to each other such that a positional preload is achieved, by which the axial relative movements of the inner ring 21 relative to the outer ring 22 can be prevented. Also possible, as an alternative to the represented two-row tapered-roller bearing slanted in an X arrangement, is a slant in an O arrangement, or a sliding bearing designed as a moment bearing.

As an alternative to the embodiment represented, the rolling bearing 20 may also be provided, on the outer ring 22 or inner ring 21, with drilled holes, by means of which a preload can be introduced into the bearing arrangement by means of screws. Corresponding bearings, in particular also in an O arrangement, of smaller wind turbines, for example in the 3 MW class, are known, but in those cases are used as bearings directly at the rotor hub.

In addition, on the side of the two-row rolling gearing 20 that faces away from the rotor shaft 2, the planet carrier 14 is supported in the gearbox housing 16 by means of a support bearing 25 designed as a floating bearing. Since the two-row rolling bearing 20 is connected to the gearbox housing 16 and thus forms a fixed bearing relative to the gearbox housing 16, a fixed-floating support of the planet carrier 14 in the gearbox housing 16 is achieved by the support bearing 25. However, embodiments without a support bearing 25 are also possible.

Figure 2:
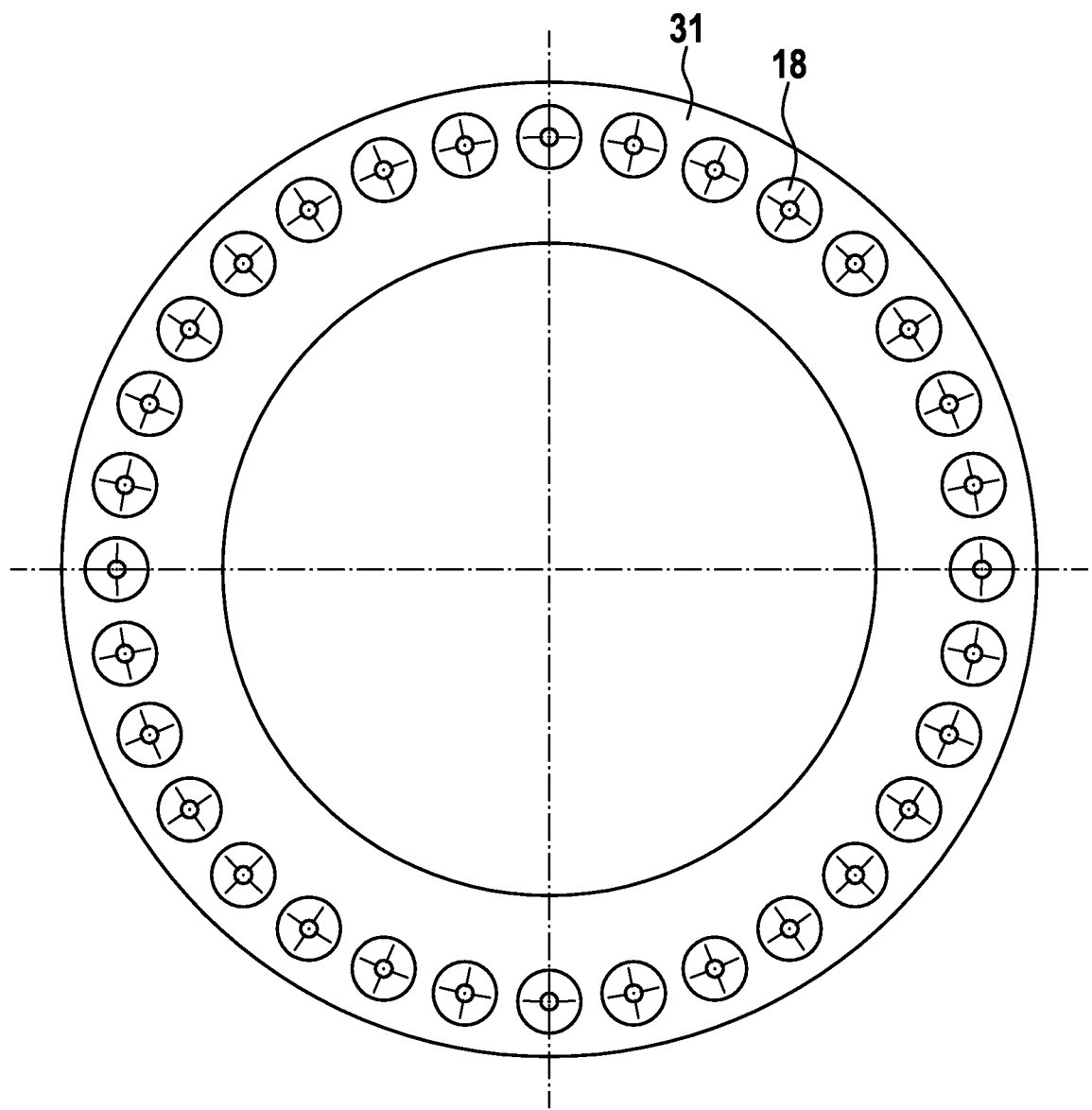
FIG. 2 is a schematic detail view of the arrangement of the elastic suspension elements of the wind turbine from FIG. 1.

The housing 16 is fastened, via a plurality of elastic suspension elements 18, to a second annular carrying structure 31, which completely surrounds the rotor shaft 2. The elastic suspension elements 18 are cylindrical elements made of rubber, the respective cylinder axis of which is aligned parallel to the rotor axis. As illustrated in FIG. 2, a total of 32 elastic suspension elements 18 are arranged in an evenly distributed manner around the rotor shaft 2. The elasticity of the suspension elements 18 in this case is designed so as to be direction-dependent, in such a manner that there is a sufficient stiffness present in the circumferential direction to direct the gear torque completely into the second carrying structure 31 solely via the suspension elements 18, such that a separate torque support can be omitted. At the same time, however, flexural deformations of the rotor shaft 2 caused by wind loads are to be compensated, at least partly, by means of the suspension elements, and the transmission of vibrations from the gearbox 10 to the second carrying structure 31 can be minimized.

Both the first and the second carrying structure 30, 31 are fastened to a mainframe 40, which is realized as a cast part. On its underside, the mainframe 40 has a flange 43 having blind holes 42 arranged in a hole pattern 41, the hole pattern 41 corresponding to that of the inner ring of the yaw bearing (only indicated), such that the mainframe 40 in principle can be fastened to the yaw bearing in a known manner.

Figure 3A:
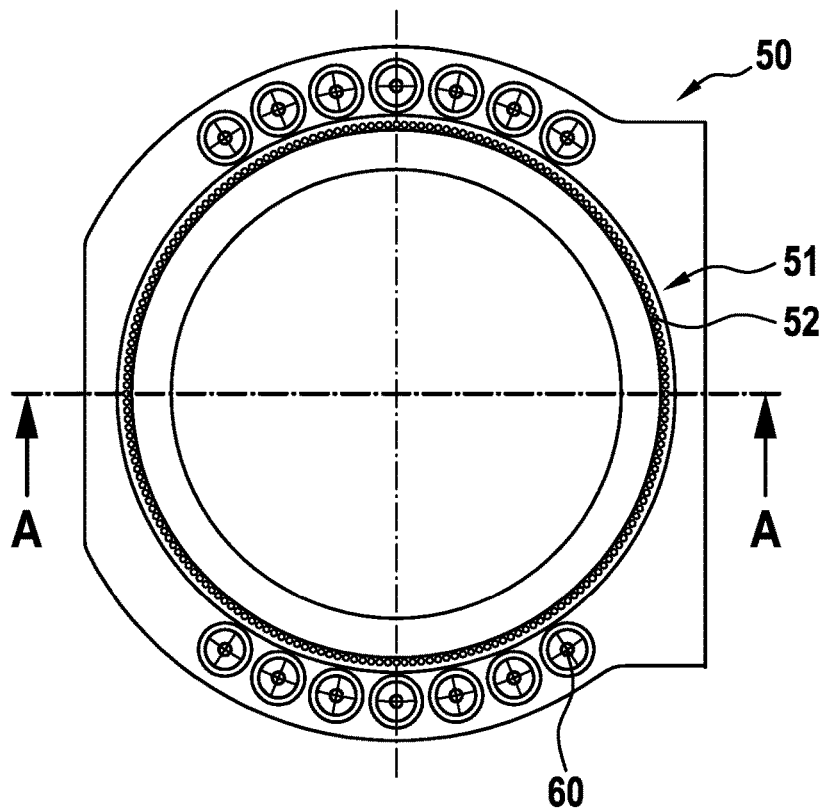
FIGS. 3a and 3b are schematic detail views of the carrier plate of the wind turbine from FIG. 1, with yaw drives and yaw brakes fastened thereto.
Figure 3B:
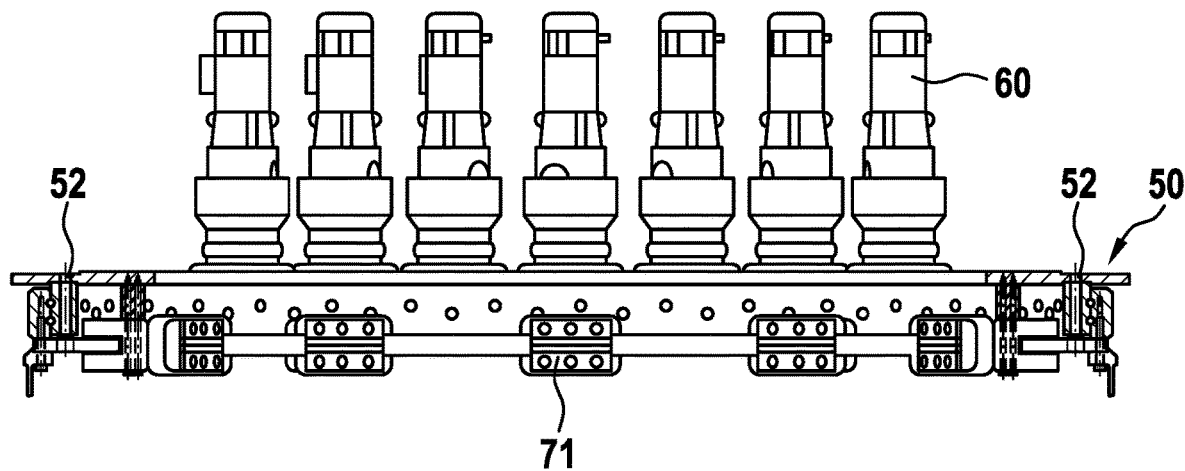

Additionally provided in the exemplary embodiment represented is a carrier plate 50, which is represented again separately in FIGS. 3*a*, *b*. The carrier plate 50 likewise has a hole pattern 51 of drilled through-holes 52 that corresponds to the hole pattern 41 of the mainframe 40, or to that of the yaw bearing. The carrier plate 50 can therefore be arranged between the mainframe 40 and the yaw bearing in such a manner that the known screwed connection of the mainframe 40 to the yaw bearing is routed through the hole pattern 51 of the carrier plate 50, whereby the carrier plate 50 is securely fastened.

As can be seen in FIG. 3*a*, *b*, provided in corresponding receivers on the carrier plate 50 there are in total 14 yaw drives 60, by means of which the azimuthal adjustment of the wind turbine is affected. Provided on the underside of the carrier plate 50 there are in total twelve yaw brakes 71, realized as brake calipers, by which the wind turbine can be secured in a predefined azimuth position.

Owing to the arrangement of the yaw drives 60 and the yaw brakes 71 on the carrier plate 50, it is possible to dispense with a more complex and therefore, for production, more cost-intensive, design of the mainframe 40. At the same time, the respectively selected number of yaw drives 60 and yaw brakes 71 enables the junk moments acting upon the carrier plate 50 to be kept small, such that neither a particularly great thickness of the carrier plate 50 nor elaborate reinforcements of the carrier plate 50 are required.

The invention claimed is:

1. Wind turbine having a drive train that comprises: a rotor shaft and a planetary gear train having a first gear stage, the rotor shaft having an axis and being connected to a planet carrier of the first gear stage in a fixed and backlash-free manner, characterized in that the rotor shaft is supported, on a side that faces away from the first gear stage, by a toroidal roller bearing, on a first carrying structure, the planet carrier that is connected to the rotor shaft in a fixed and backlash-free manner is supported by a moment bearing, comprising a fixed bearing, an outer ring of the moment bearing being connected to a housing, and a combination of the outer ring of the moment bearing and the housing being connected to a second carrying structure via at least three elastic suspension elements arranged in an annular manner around the rotor axis.

2. The wind turbine according to 1 characterized in that six or more elastic suspension elements are provided.

3. The wind turbine according to claim 1 characterized in that the elastic suspension elements are cylindrical and are arranged with their cylinder axis parallel to the rotor axis.

4. The wind turbine according to claim 1 characterized in that the elasticity of the elastic suspension elements is configured so as to be direction-dependent, in such a manner that there is a sufficient stiffness present in a circumferential direction of the rotor axis to direct a gear torque completely into the second carrying structure solely via the suspension elements.

5. The wind turbine according to claim 1 characterized in that the moment bearing is a sliding bearing or a rolling bearing.

6. The wind turbine according to claim 5 characterized in that the tapered-roller bearing has an inductively hardened, divided outer or inner ring, wherein the corresponding divided ring has two parts having drilled holes.

7. The wind turbine according to claim 6 characterized in that one part of the divided ring has thread-free drilled through-holes, and the other part of the divided ring at a greater distance from the toroidal roller bearing has drilled holes having an internal thread.

8. The wind turbine according to claim 1 characterized in that the planet carrier of the first gear stage on a side of the moment bearing that faces away from the rotor shaft, is supported by a support bearing configured as a floating bearing to form a fixed-floating support of the planet carrier.

9. The wind turbine according to claim 8 characterized in that the support bearing is a rolling bearing.

10. The wind turbine according to claim 8 wherein the support bearing is a cylindrical roller bearing.

11. The wind turbine according to claim 1 characterized in that the housing is a gearbox housing of the planetary train.

12. The wind turbine according to claim 1 characterized in that the first and/or second carrying structure is fastened to a mainframe.

13. The wind turbine according to claim 12, characterized in that a carrier plate has a plurality of receivers and is configured to accommodate eight or more yaw drives, and/or respectively one yaw drive is provided in each receiver of the carrier plate.

14. The wind turbine according to claim 12 characterized in that on a side that faces away from a receiver of the yaw drives, a carrier plate has at least five receivers for yaw brakes.

15. The wind turbine according to claim 14 characterized in that on a side that faces away from the receiver of the yaw drives, the carrier plate has at least eight receivers for yaw brakes and one yaw brake being provided in each receiver.

16. The wind turbine, according to claim 1 having a mainframe for accommodating component parts for supporting the rotor of the wind turbine, characterized in that the mainframe has a flange having a hole pattern identical to a hole pattern of a yaw bearing of the wind turbine, and a carrier plate is provided for accommodating at least six yaw drives, the carrier plate having a hole pattern identical to the hole pattern of the yaw bearing and being arranged between the mainframe and the yaw bearing in such a manner that a screwed connection of the mainframe to the yaw bearing is routed through the hole pattern of the carrier plate.

17. The wind turbine according to claim 16 characterized in that on a side that faces away from the receiver of the yaw drives, the carrier plate has at least five receivers for yaw brakes, one yaw brake being provided in each receiver.

18. The wind turbine according to 1 characterized in that six or more suspension elements are provided.

19. The wind turbine according to 1 characterized in that the suspension elements are evenly distributed.

20. The wind turbine according to claim 1 wherein the moment bearing comprises a two-row tapered-roller bearing slanted in an X or O arrangement.

* * * * *